United States Patent
Egawa et al.

(10) Patent No.: US 7,911,522 B2
(45) Date of Patent: Mar. 22, 2011

(54) AMPLIFICATION-TYPE CMOS IMAGE SENSOR

(75) Inventors: Yoshitaka Egawa, Yokohama (JP); Shinji Ohsawa, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/698,440

(22) Filed: Feb. 2, 2010

(65) Prior Publication Data

US 2010/0134674 A1 Jun. 3, 2010

Related U.S. Application Data

(62) Division of application No. 11/612,115, filed on Dec. 18, 2006, now Pat. No. 7,679,665.

(30) Foreign Application Priority Data

Dec. 19, 2005 (JP) .................................. 2005-365051

(51) Int. Cl.
*H04N 3/14* (2006.01)
*H04N 5/335* (2006.01)
(52) U.S. Cl. .................... 348/308; 348/302; 348/294
(58) Field of Classification Search .............. 348/207.99, 348/222.1, 230.1, 294–310; 257/428, 431; 250/208.1
See application file for complete search history.

(56) References Cited

U.S. PATENT DOCUMENTS

| | | | |
|---|---|---|---|
| 4,392,158 A | 7/1983 | Aoki et al. | |
| 4,866,292 A | 9/1989 | Takemoto et al. | |
| 4,870,493 A | 9/1989 | Izawa et al. | |
| 5,027,217 A | 6/1991 | Oshio et al. | |
| 5,262,871 A | 11/1993 | Wilder et al. | |
| 5,420,631 A | 5/1995 | Hamasaki | |
| 5,444,484 A | 8/1995 | Yutani et al. | |
| 6,507,365 B1 | 1/2003 | Nakamura et al. | |
| 6,794,627 B2 | 9/2004 | Lyon et al. | |
| 6,900,837 B2 | 5/2005 | Muramatsu et al. | |
| 6,903,768 B1 | 6/2005 | Ohsawa et al. | |
| 6,950,138 B2 | 9/2005 | Hamaguchi | |
| 6,995,797 B2 | 2/2006 | Takayanagi | |

(Continued)

FOREIGN PATENT DOCUMENTS

| | | |
|---|---|---|
| CN | 1477860 A | 2/2004 |
| CN | 1700745 A | 11/2005 |
| JP | 9-247535 | 9/1997 |
| JP | 11-191891 | 7/1999 |

(Continued)

OTHER PUBLICATIONS

Japanese Office Action with English translation dated Nov. 30, 2010 in Japanese Patent Application No. 2005-365051, 6 pages.

*Primary Examiner* — David L Ometz
*Assistant Examiner* — Richard Bemben
(74) *Attorney, Agent, or Firm* — Oblon, Spivak, McClelland, Maier & Neustadt, L.L.P.

(57) ABSTRACT

Pixels are two-dimensionally arranged into rows and columns in an image sensing region of a solid-state image sensing device, and divided into a plurality of vertical blocks. A vertical signal line is connected to each pixel column. A voltage read out from a pixel is A/D-converted and held in a holding circuit. A vertical block selection circuit outputs a vertical block selection signal in response to a horizontal sync pulse. An intra-block line selection circuit selects one pixel row in one block or simultaneously selects a plurality of pixel rows in one block, in accordance with the selection signal and a signal for setting the number of lines to be selected. A pulse selector circuit supplies a pixel driving pulse signal to a pixel row selected by the intra-block line selection circuit.

2 Claims, 8 Drawing Sheets

| U.S. PATENT DOCUMENTS | | | | FOREIGN PATENT DOCUMENTS | | |
|---|---|---|---|---|---|---|
| 7,292,276 B2 | 11/2007 | Egawa et al. | JP | 2000-4406 | 1/2000 |
| 7,362,366 B2 | 4/2008 | Egawa et al. | JP | 2002-320146 | 10/2002 |
| 7,420,604 B2 | 9/2008 | Nasu | JP | 3361005 | 10/2002 |
| 7,474,346 B2 | 1/2009 | Kanai | JP | 2003-60990 | 2/2003 |
| 7,528,872 B2 | 5/2009 | Gomi et al. | JP | 2005-184634 | 7/2005 |
| 7,532,148 B2 | 5/2009 | Muramatsu et al. | JP | 2005-191814 | 7/2005 |
| 2004/0159788 A1 | 8/2004 | Shigenaka et al. | JP | 2005-318292 | 11/2005 |
| 2006/0001753 A1 | 1/2006 | Funakoshi et al. | JP | 2005-348040 | 12/2005 |
| 2006/0279650 A1 | 12/2006 | Watanabe et al. | | | |

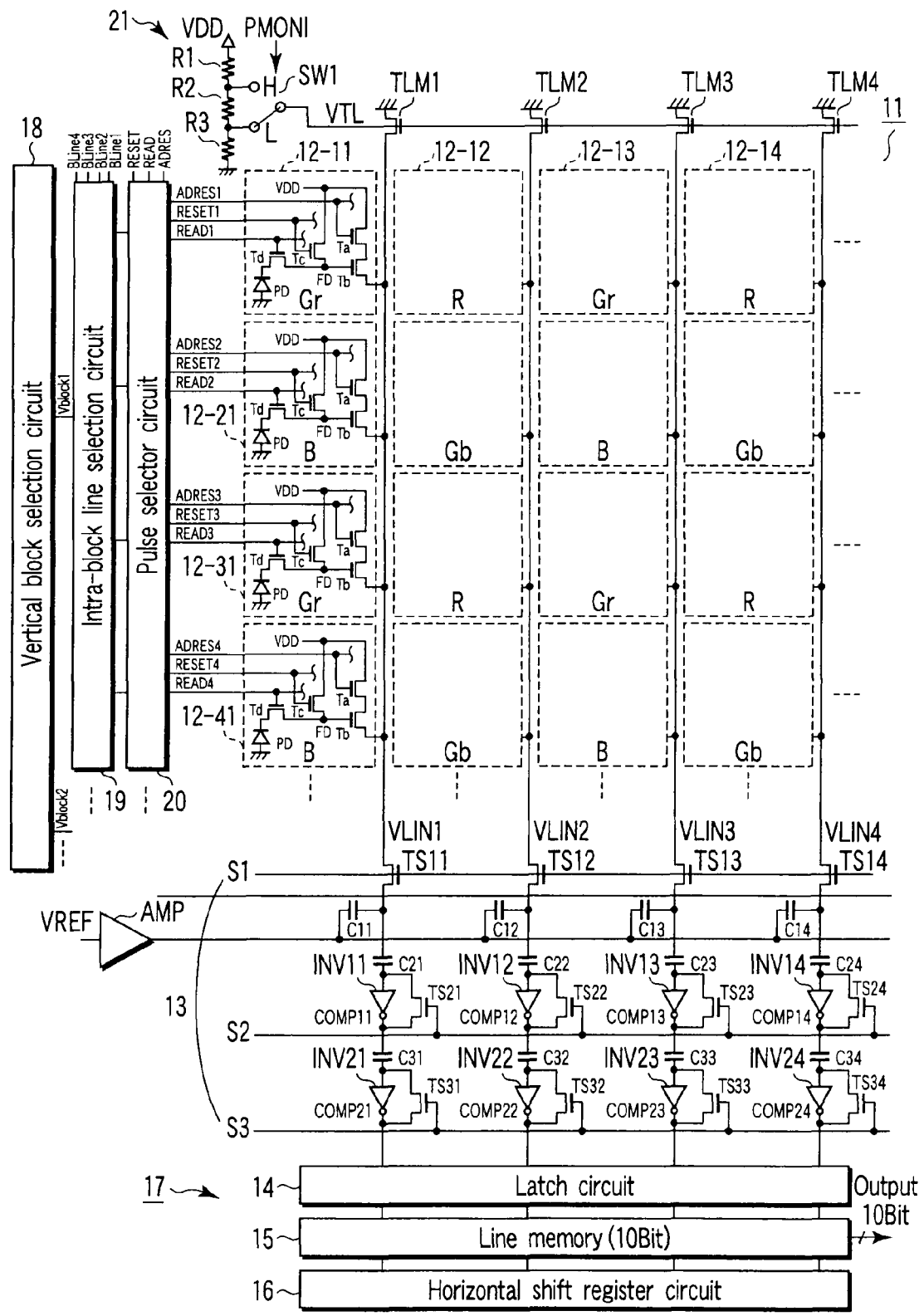
F I G. 1

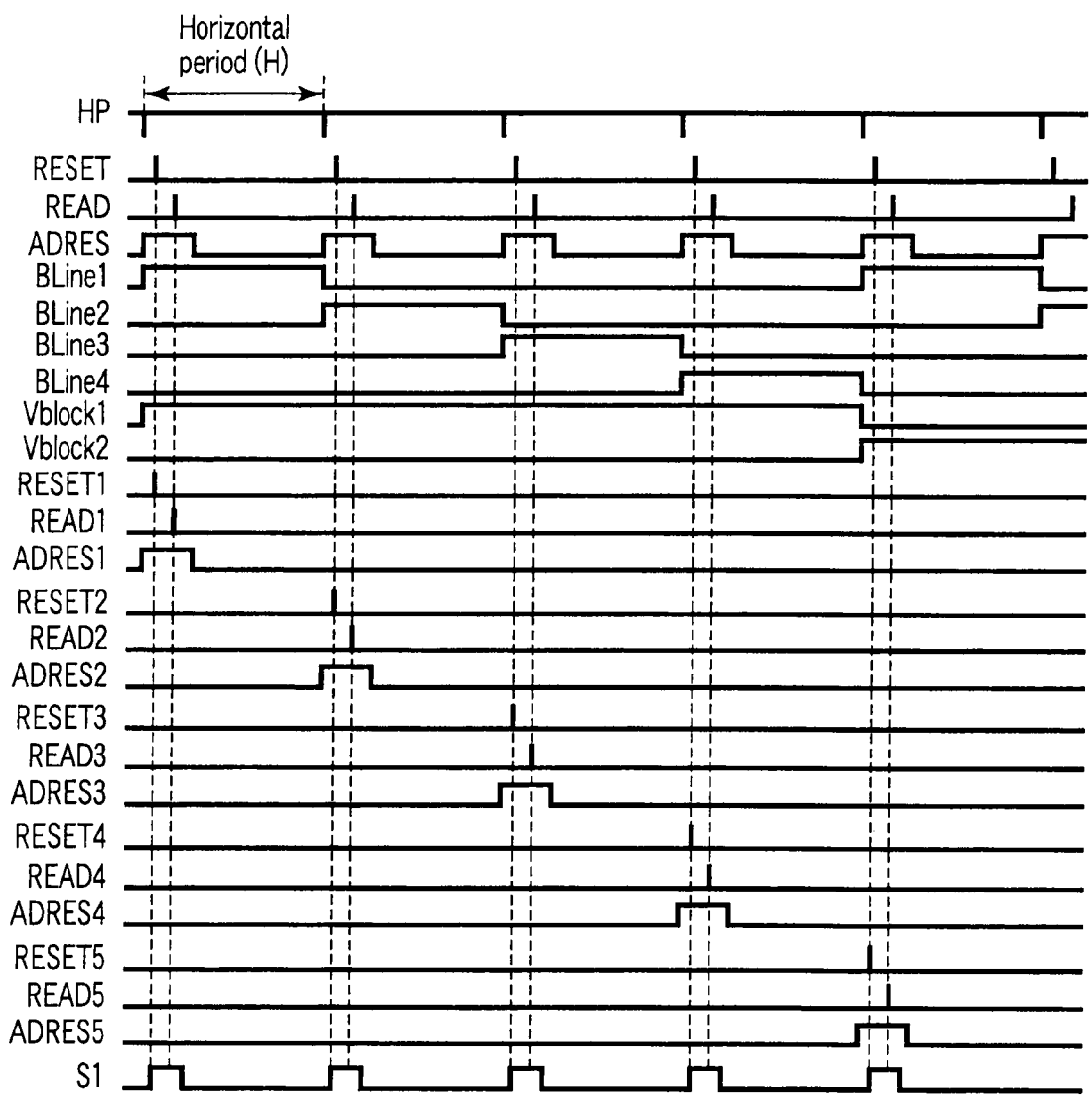
F I G. 3

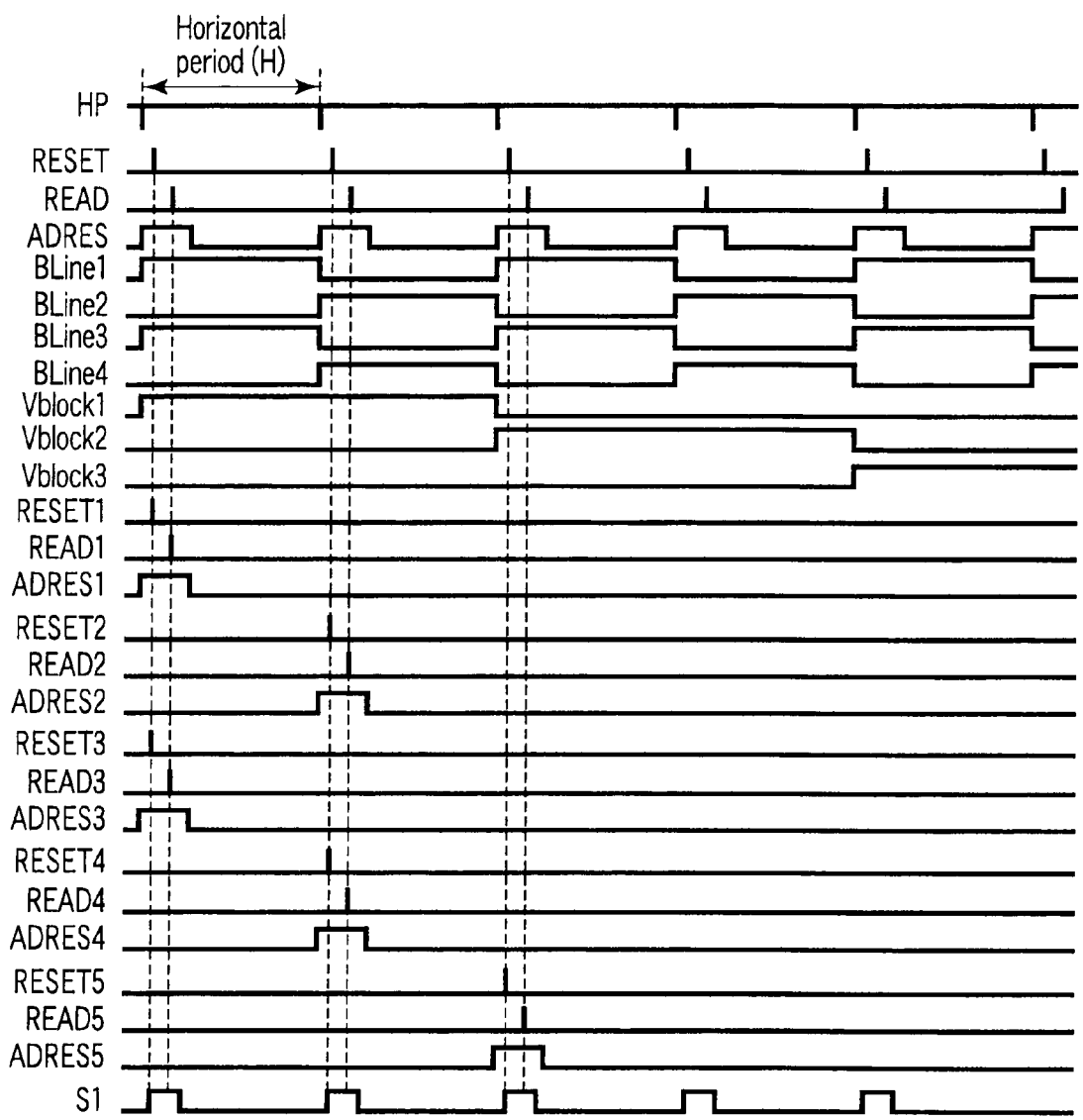
F I G. 4

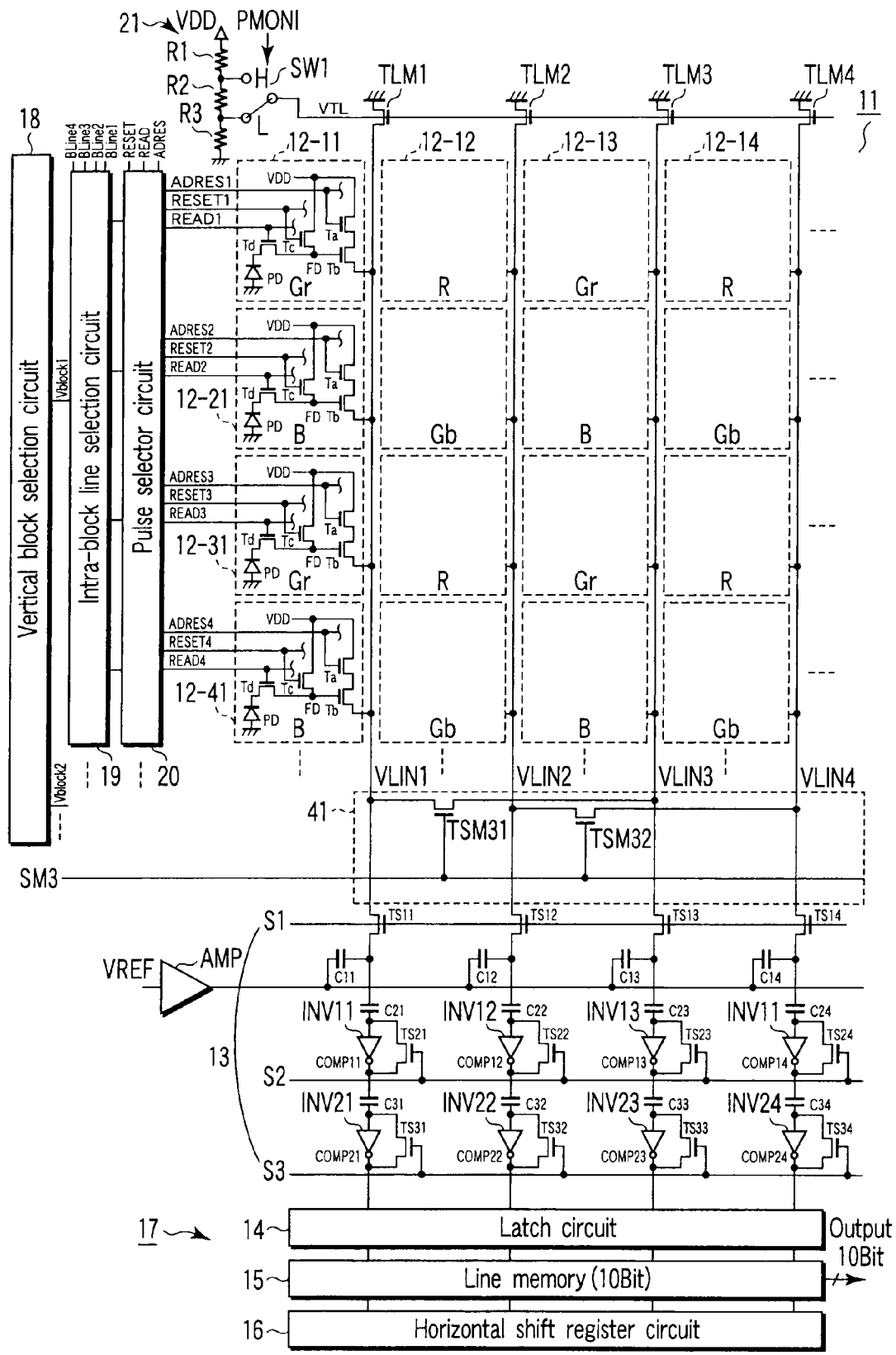
F I G. 6

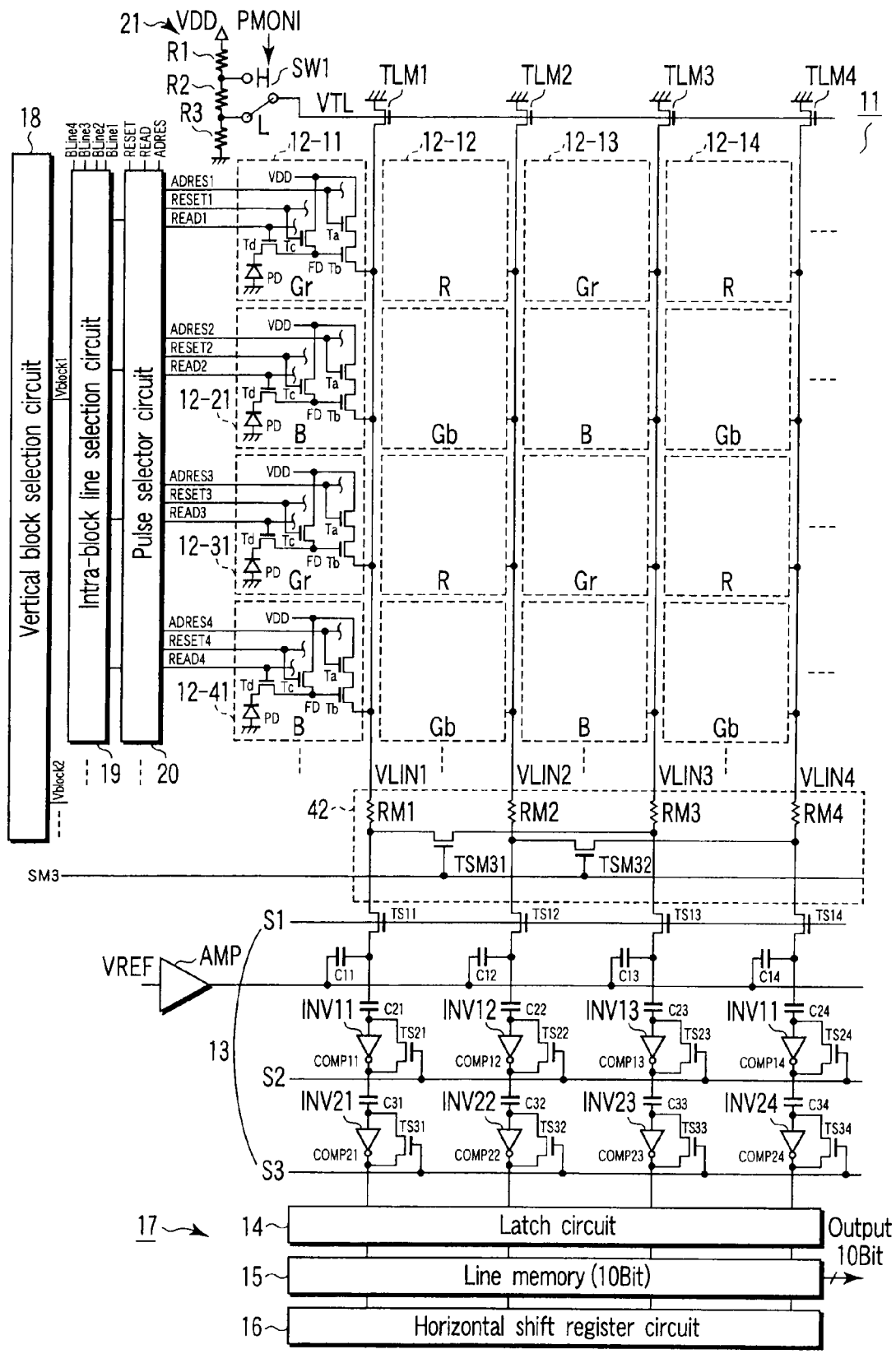
F I G. 7

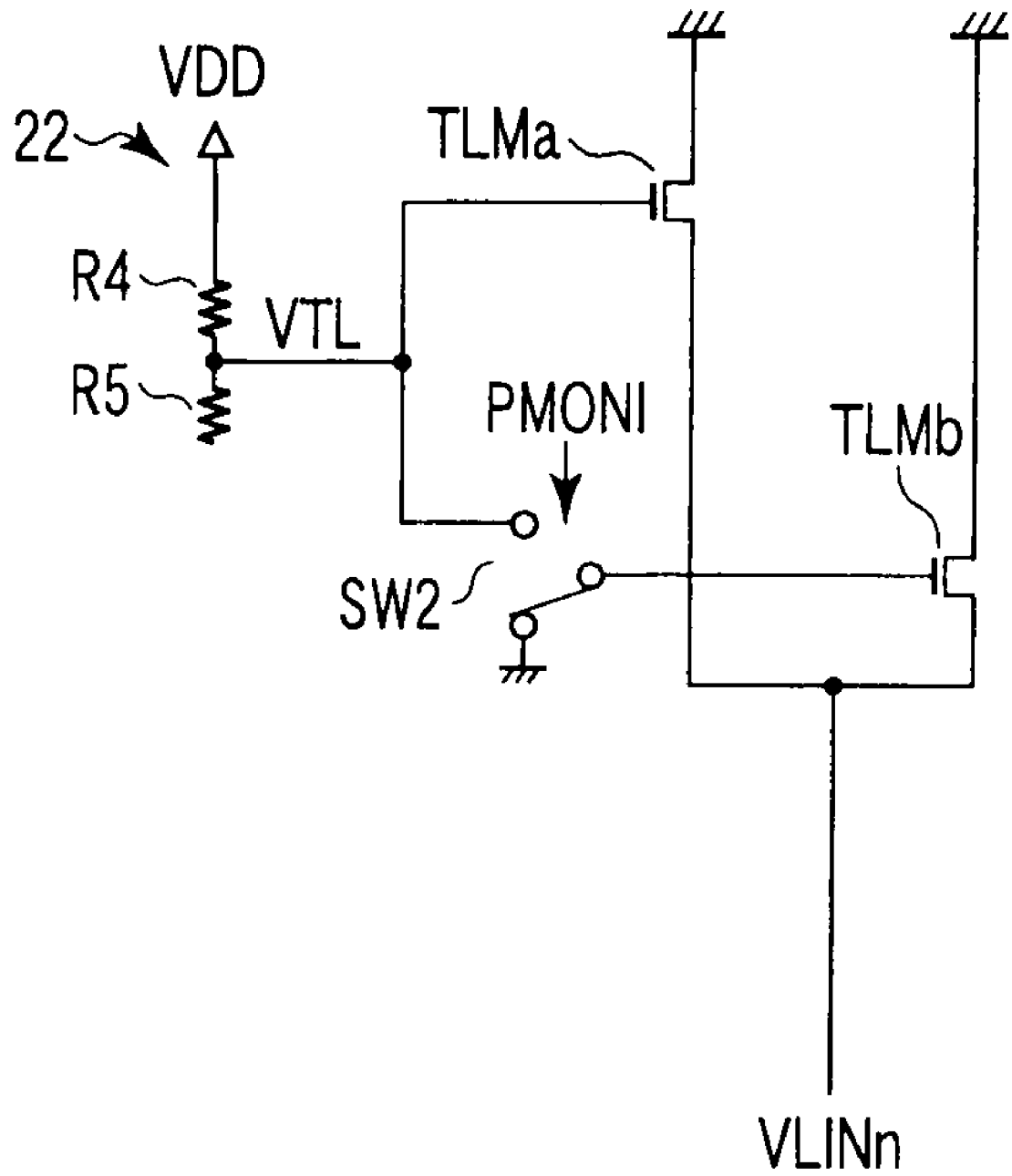
F I G. 8

AMPLIFICATION-TYPE CMOS IMAGE SENSOR

CROSS-REFERENCE TO RELATED APPLICATIONS

This application is a divisional of U.S. application Ser. No. 11/612,115, filed Dec. 18, 2006 and is based upon and claims the benefit of priority from prior Japanese Patent Application No. 2005-365051, filed Dec. 19, 2005, the entire contents of which are incorporated herein by reference.

BACKGROUND OF THE INVENTION

1. Field of the Invention

The present invention relates to a solid-state image sensing device such as a CMOS image sensor, and is applied to, e.g., a cell phone with an image sensor, a digital camera, and a video camera.

2. Description of the Related Art

A CMOS image sensor is used in, e.g., a cell phone with an image sensor, a digital camera, and a video camera. A CMOS image sensor of this type performs a noise reducing operation (called CDS: Correlated Double Sampling) during analog-to-digital conversion of a readout signal charge. Also, the CMOS image sensor includes two stages of A/D converters in order to perform high-accuracy A/D conversion. Furthermore, a shift register circuit or decoder circuit is generally used as a vertical line selection circuit (e.g., Japanese Patent No. 3361005).

The CMOS image sensor as described above performs a thinning operation which reads two pixel lines and skips two pixel lines arranged in the vertical direction during a monitoring operation for reducing the number of pixels. When this thinning operation is performed, however, sampling points of G signals (a Gr signal and Gb signal) for generating a luminance signal become discontinuous in a color sensor having a Bayer pattern, so a spurious signal deteriorates the image quality.

As a measure to cope with this deterioration in image quality cause by a spurious signal, Jpn. Pat. Appln. KOKAI Publication No. H09-247535 has proposed a technique which averages vertical signals by using capacitors. However, the addition of the capacitors increases the pattern occupation area, or buffer circuits formed in one-to-one correspondence with the capacitors increase the power consumption.

Accordingly, demands have arisen for a solid-state image sensing device capable of preventing the deterioration in image quality caused by a spurious signal without increasing the pattern occupation area or power consumption.

BRIEF SUMMARY OF THE INVENTION

A solid-state image sensing device according to an aspect of the present invention comprises an image sensing region in which pixels are two-dimensionally arranged into rows and columns on a semiconductor substrate, the pixel comprising a photoelectric conversion circuit configured to convert an optical signal into a signal charge and store the signal charge, a read circuit configured to read out the electric charge stored in the photoelectric conversion circuit to a detecting portion, an amplification circuit configured to amplify and output a voltage corresponding to an amount of electric charge in the detecting portion, and a reset circuit configured to reset the electric charge in the detecting portion, a vertical signal line connected to each pixel column in the image sensing region, a variable load circuit connected to the vertical signal line, and configured to increase an electric current flowing through the vertical signal line when a plurality of pixel rows are simultaneously selected, and a storage circuit configured to hold the voltage read out to the vertical signal line from each amplification circuit in a selected pixel row.

A solid-state image sensing device according to another aspect of the present invention comprises an image sensing region in which pixels are two-dimensionally arranged into rows and columns on a semiconductor substrate, the pixel comprising a photoelectric conversion circuit configured to convert an optical signal into a signal charge and store the signal charge, a read circuit configured to read out the electric charge stored in the photoelectric conversion circuit to a detecting portion, an amplification circuit configured to amplify and output a voltage corresponding to an amount of electric charge in the detecting portion, and a reset circuit configured to reset the electric charge in the detecting portion, a vertical signal line connected to each pixel column in the image sensing region, a storage circuit configured to hold a voltage read out to the vertical signal line from each amplification circuit in a selected pixel row, and a switch addition circuit formed between the image sensing region and the storage circuit, and configured to connect a plurality of vertical signal lines to an input terminal of the storage circuit and add data read out from a plurality of pixels.

A solid-state image sensing device according to still another aspect of the present invention comprises an image sensing region in which pixels are two-dimensionally arranged into rows and columns on a semiconductor substrate, the pixel comprising a photoelectric conversion circuit configured to convert an optical signal into a signal charge and store the signal charge, a read circuit configured to read out the electric charge stored in the photoelectric conversion circuit to a detecting portion, an amplification circuit configured to amplify and output a voltage corresponding to an amount of electric charge in the detecting portion, and a reset circuit configured to reset the electric charge in the detecting portion, a vertical signal line connected to each pixel column in the image sensing region, an analog-to-digital conversion circuit configured to perform analog-to-digital conversion on the voltage read out to the vertical signal line from each amplification circuit in a selected pixel row, a holding circuit configured to hold digital data obtained by the analog-to-digital conversion circuit, and a switch addition circuit formed between the image sensing region and the analog-to-digital conversion circuit, and configured to connect a plurality of vertical signal lines to an input terminal of the analog-to-digital conversion circuit and add data read out from a plurality of pixels, the switch addition circuit comprising a first synthesizing switch whose current path is connected between the vertical signal line and an input terminal of the analog-to-digital conversion circuit, and a second synthesizing switch whose current path is connected between the vertical signal line and an input terminal, which is different from the input terminal connected to the first synthesizing switch, of the analog-to-digital conversion circuit, wherein when the second synthesizing switch is turned on, a portion of the analog-to-digital conversion circuit connected to the second synthesizing switch is stopped.

BRIEF DESCRIPTION OF THE SEVERAL VIEWS OF THE DRAWING

FIG. 1 is a circuit diagram which explains a solid-state image sensing device according to the first embodiment of the present invention, and shows an example of the arrangement of an amplification-type CMOS image sensor;

FIG. 3 is a timing chart showing standard sensor operation timings in the circuit shown in FIG. 1;

FIG. 4 is a timing chart showing operation timings when reducing the number of pixels in the circuit shown in FIG. 1;

FIG. 6 is a circuit diagram which explains a solid-state image sensing device according to the third embodiment of the present invention, and shows an example of the arrangement of an amplification-type CMOS image sensor;

FIG. 7 is a circuit diagram which explains a solid-state image sensing device according to the fourth embodiment of the present invention, and shows an example of the arrangement of an amplification-type CMOS image sensor; and FIG. 8 is a circuit diagram which explains a modification of the present invention, and shows another example of the arrangement of a variable load circuit.

DETAILED DESCRIPTION OF THE INVENTION

First Embodiment

Figure 2:
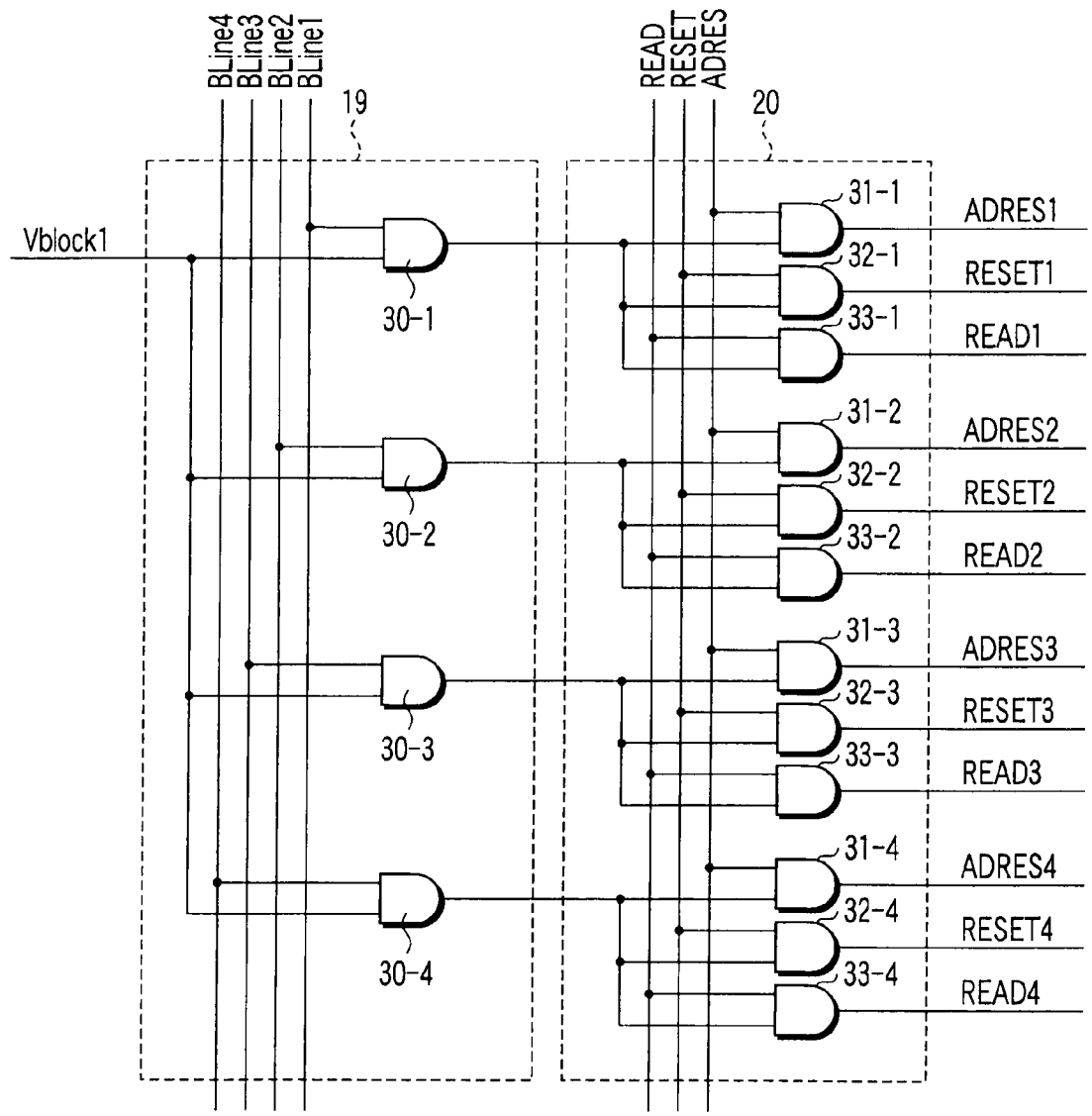
FIG. 2 is a circuit diagram showing examples of the arrangements of a intra-block line selection circuit and pulse selector circuit in the circuit shown in FIG. 1.

FIG. 1 is a circuit diagram which explains a solid-state image sensing device according to the first embodiment of the present invention, and shows an example of the arrangement of an amplification-type CMOS image sensor. In an image sensing region 11, unit cells 12-11, 12-12, . . . , 12-mn as pixels are two-dimensionally arranged into m rows×n columns. FIG. 1 shows details of 4 rows×4 columns in the image sensing region 11. The image sensing region 11 is divided into a plurality of blocks in the vertical direction. Vertical signal lines VLIN1, VLIN2, VLIN3, . . . are connected to the individual unit cell columns in the image sensing region 11.

In one end (the upper portion) of the image sensing region 11, load transistors TLM1, TLM2, TLM3, . . . for a source follower circuit are arranged in the horizontal direction. The current path of each of the load transistors TLM1, TLM2, TLM3, . . . is connected between one end of a corresponding one of the vertical signal lines VLIN1, VLIN2, VLIN3, . . . and the ground point. A bias circuit 21 applies a bias voltage VTL to the gates of the load transistors TLM1, TLM2, TLM3, . . . . The load transistors TLM1, TLM2, TLM3, . . . and the bias circuit 21 function as a variable load circuit.

The bias circuit 21 includes resistors R1 to R3 and a switch SW1. The resistors R1 to R3 are connected in series between a power supply VDD and the ground point. The switch SW1 selects, as the bias voltage VTL, a high voltage (H) at the connection node between the resistors R1 and R2 or a low voltage (L) at the connection node between the resistors R2 and R3 in response to a signal PMONI. Since this changes the ON resistance (conduction resistance) of the load transistors TLM1, TLM2, TLM3, . . . , the amount of electric current flowing through the vertical signal lines VLIN1, VLIN2, VLIN3, . . . can be changed.

In a normal operation, the switch SW1 selects the low voltage (L) at the connection node between the resistors R2 and R3, and supplies the low voltage (L) as the bias voltage VTL to the gates of the load transistors TLM1, TLM2, TLM3, . . . . Consequently, the conduction resistance of the load transistors TLM1, TLM2, TLM3, . . . increases, and the amount of electric current flowing through the vertical lines VLIN1, VLIN2, VLIN3, . . . decreases.

On the other hand, when a plurality of pixel rows are simultaneously selected, the switch SW1 selects the high voltage (H) at the connection node between the resistors R1 and R2, and supplies the high voltage (H) as the bias voltage VTL to the gates of the load transistors TLM1, TLM2, TLM3, . . . . Therefore, the conduction resistance of the load transistors TLM1, TLM2, TLM3, . . . decreases, and the amount of electric current flowing through the vertical lines VLIN1, VLIN2, VLIN3, . . . increases.

The other ends (lower portions) of the vertical signal lines VLIN1, VLIN2, VLIN3, . . . are connected to a column-type noise canceling circuit and analog-to-digital converter (CDS & ADC) 13, a latch circuit 14 which latches a signal having undergone analog-to-digital conversion, a line memory (10 bits) 15 for storing the latched signal, and a horizontal shift register circuit 16 for reading out the signal from the line memory 15. A circuit unit 17 formed by, e.g., the latch circuit 14, line memory 15, and horizontal shift register circuit 16 act as a holding circuit which holds digital data obtained by the CDS & ADC 13. Also, the circuit unit 17 and CDS & ADC 13 function as a storage circuit which holds a voltage read out to the vertical signal line from each amplification circuit in a selected pixel row.

A vertical block selection circuit 18, intra-block line selection circuit 19, and pulse selector circuit 20 are formed adjacent to the image sensing region 11. The pulse selector circuit 20 supplies pulse signals ADRES1, ADRES2, . . . , RESET1, RESET2, . . . , and READ1, READ2, . . . to the individual rows of unit cells.

That is, block selection signals Vblock1, Vblock2, . . . output from the vertical block selection circuit 18 select blocks in the image sensing region 11. The vertical block selection circuit 18 is formed by a shift register circuit or decoder circuit. The intra-block line selection circuit 19 selects unit cell rows (pixel rows) in the block selected by the vertical block selection circuit 18, on the basis of signals BLine1 to BLine4. The intra-block line selection circuit 19 can be formed by using a plurality of AND circuits. The intra-block line selection circuit 19 selects the presence/absence of averaging or the number of lines to be averaged by a High-level combination of the pulse signals BLine1 to BLine4. The pulse selector circuit 20 generates the signals RESET1, READ1, and ADRES1, signals RESET2, READ2, and ADRES2, and signals RESET3, READ3, and ADRES3, . . . on the basis of the output signal from the intra-block line selection circuit 19 and pixel driving pulse signals RESET, READ, and ADRES, and selects unit cell rows by these signals.

As described above, vertical averaging can be easily selected by separating a vertical (row) pixel driving pulse generator into the three circuits, i.e., the vertical block selection circuit 18, intra-block line selection circuit 19, and pulse selector circuit 20.

Each of the unit cells 12-11, 12-12, . . . comprises four transistors (a row selection transistor Ta, an amplification transistor Tb as an amplification circuit, a reset transistor Tc as a reset circuit, and a read transistor Td as a read circuit) and a photodiode (photoelectric conversion circuit) PD. In the unit cell 12-11, for example, the current paths of the transistors Ta and Tb are connected in series between the power supply VDD and vertical signal line VLIN1. The gate of the transistor Ta receives the pulse signal ADRES1. The current path of the transistor Tc is connected between the power supply VDD and the gate (a detecting portion FD) of the transistor Tb, and the gate of the transistor Tc receives the pulse signal RESET1. One end of the current path of the transistor Td is connected to the detecting portion FD, and the gate of the transistor Td receives the pulse signal (read pulse) READ1. The cathode of the photodiode PD is connected to the other end of the current path of the transistor Td, and the anode of the photodiode PD is grounded.

The CDS & ADC 13 includes capacitors C11, C12, C13, . . . and C21, C22, C23, . . . as a noise canceller, transistors TS11, TS12, TS13, . . . for transmitting signals of the vertical signal lines VLIN1, VLIN2, VLIN3, . . . , transistors TS21, TS22, TS23, . . . for setting the input threshold voltages of comparator circuits, and two stages of comparator circuits COMP11, COMP12, COMP12, COMP13, . . . and COMP21, COMP22, COMP23, . . . .

One end of the current path of each of the transistors TS11, TS12, TS13, . . . is connected to a corresponding one of the vertical signal lines VLIN1, VLIN2, VLIN3, . . . , and the gates of the transistors TS11, TS12, TS13, . . . receive a pulse signal S1 output from a timing generator (not shown). One electrode of each of the capacitors C11, C12, C13, . . . and one electrode of each of the capacitors C21, C22, C23, . . . are connected to the other end of the current path of a corresponding one of the transistors TS11, TS12, TS13, . . . . An amplification circuit AMP supplies a reference voltage VREF (triangular wave) for comparison of the analog-to-digital converter (ADC) to the other electrodes of the capacitors C11, C12, C13, . . . . The other electrode of each of the capacitors C11, C12, C13, . . . is connected to a corresponding one of the input terminals of the comparator circuits COMP11, COMP12, COMP13, . . . .

The comparator circuits COMP11, COMP12, COMP13, . . . respectively comprise inverters INV11, INV12, INV13, . . . , and the transistors TS21, TS22, TS23, . . . having current paths respectively connected between the input terminals and output terminals of the inverters INV11, INV12, INV13, . . . . The comparator circuits COMP21, COMP22, COMP33, . . . respectively comprise inverters INV21, INV22, INV23, . . . , and transistors TS31, TS32, TS33, . . . having current paths respectively connected between the input terminals and output terminals of the inverters INV21, INV22, INV23, . . . . Capacitors C31, C32, C33, . . . are respectively connected between the comparator circuits COMP11, COMP12, COMP13, . . . and COMP21, COMP22, COMP23, . . . . The gates of the transistors TS21, TS22, TS23, . . . receive a pulse signal S2, and the gates of the transistors TS31, TS32, TS33, . . . receive a pulse signal S3.

The latch circuit 14 latches digital signals output from the comparator circuits COMP21, COMP22, COMP23, . . . . The latch circuit 14 is connected to the line memory 15 for reaching out the latched signals, and the horizontal shift register circuit 16. The line memory 15 outputs a 10-bit digital signal.

FIG. 2 is a circuit diagram showing examples of the arrangements of the intra-block line selection circuit 19 and pulse selector circuit 20 in the circuit shown in FIG. 1, and shows a logic configuration for averaging two vertical lines. In this example, both the intra-block line selection circuit 19 and pulse selector circuit 20 are implemented by AND circuits. To simplify the explanation, this circuit diagram includes only AND gates. Actual logic circuits are not limited to AND gates. The intra-block line selection circuit 19 comprises AND gates 30-1 to 30-4. One input terminal of each of the AND gates 30-1 to 30-4 receives the signal Vblock1 output from the vertical block selection circuit 18, and the other input terminal of each of the AND gates 30-1 to 30-4 receives a corresponding one of the signals BLine1 to BLine4. The AND gates 30-1 to 30-4 supply output signals to the pulse selector circuit 20.

The intra-block line selection circuit 19 selects one pixel row in one vertical block or simultaneously selects a plurality of pixel rows in one vertical block, on the basis of the vertical block selection signal Vblock1 output from the vertical block selection circuit 18, and the signals BLine1 to BLine4 for setting the number of lines to be selected. In the example shown in FIG. 2, one to four lines in a block selected by the selection signal Vblock1 can be simultaneously selected in accordance with a combination of the levels of the signals BLine1 to BLine4.

The pulse selector circuit 20 includes AND gates 31-1 to 31-4, 32-1 to 32-4, and 33-1 to 33-4. One input terminal of each of the AND gates 31-1, 32-1, and 33-1 receives the output signal from the AND gate 30-1, the other input terminal of each of the AND gates 31-1, 32-1, and 33-1 receives a corresponding one of the pixel driving pulse signals ADRES, RESET, and READ, and the AND gates 31-1, 32-1, and 33-1 respectively output the pulse signals ADRES1, RESET1, and READ1. One input terminal of each of the AND gates 31-2, 32-2, and 33-2 receives the output signal from the AND gate 30-2, the other input terminal of each of the AND gates 31-2, 32-2, and 33-2 receives a corresponding one of the pixel driving pulse signals ADRES, RESET, and READ, and the AND gates 31-2, 32-2, and 33-2 respectively output the pulse signals ADRES2, RESET2, and READ2. One input terminal of each of the AND gates 31-3, 32-3, and 33-3 receives the output signal from the AND gate 30-3, the other input terminal of each of the AND gates 31-3, 32-3, and 33-3 receives a corresponding one of the pixel driving pulse signals ADRES, RESET, and READ, and the AND gates 31-3, 32-3, and 33-3 respectively output the pulse signals ADRES3, RESET3, and READ3. One input terminal of each of the AND gates 31-4, 32-4, and 33-4 receives the output signal from the AND gate 30-4, the other input terminal of each of the AND gates 31-4, 32-4, and 33-4 receives a corresponding one of the pixel driving pulse signals ADRES, RESET, and READ, and the AND gates 31-4, 32-4, and 33-4 respectively output the pulse signals ADRES4, RESET4, and READ4.

FIG. 3 is a timing chart showing standard sensor operation timings in the circuits shown in FIGS. 1 and 2. The output signals Vblock1 and Vblock2 from the vertical block selection circuit 18 sequentially change to High level at a period of 4 H in response to a horizontal sync pulse HP (one horizontal period is H). The intra-block line selection circuit 19 receives the signals BLine1, BLine2, BLine3, and BLine4 in synchronism with the horizontal sync pulse HP. The signals BLine1, BLine2, BLine3, and BLine4 sequentially change to High level at a period of 1 H.

The pulse selector circuit 20 receives the pixel driving pulse signals RESET, READ, and ADRES, and supplies the logical products (pulse signals RESET1, RESET2, RESET3, . . . , READ1, READ2, READ3, . . . , and ADRES1, ADRES2, ADRES3, . . . ) of these signals and the output signals from the intra-block line selection circuit 19 to the unit cell rows (pixel rows) in the image sensing region 11. In this case, the pulse signals ADRES1, RESET1, and READ1 of vertical line 1 output from the pulse selector circuit 20 first change to High level. Since the pulse signal ADRES1 changes to High level, the source follower circuit comprising the amplification transistor Tb and load transistor TLM1 operates. A photoelectrically converted signal charge is stored in the photodiode PD for a predetermined period, the pulse signal RESET1 is set at High level in order to remove a noise signal such as a dark current from the detecting portion FD before reading out the stored signal charge, and the detecting portion FD is set at a power supply voltage VDD (=2.8 V). When the pulse signal RESET1 changes to Low level after that, a voltage (reset level) is output to the vertical signal line VLIN1 with no signal in the detecting portion FD as a reference. This signal is stored in the capacitor C21. Then, the transistor Td is turned on by changing the pulse signal READ1 to High level, and the signal charge stored in the photodiode PD is read out to the detecting portion FD. As a consequence, the voltage (signal+reset) level of the detecting portion FD is read out to the vertical signal line VLIN1. This signal is stored in the capacitor C11. When the pulse signal READ1 changes to Low level after that, the reference voltage VREF is changed to convert the analog signal into a digital signal by using the threshold voltage of the comparator circuit COMP11. In this case, the analog signal is supplied to the connection node between the capacitors C11 and C21, and the reset level can be removed from the analog signal because the polarity of the reset level of the capacitor C21 is reversed.

The signals to be supplied to the unit cell rows (pixel rows) in the image sensing region 11 are sequentially output in synchronism with the horizontal sync pulse HP. Both the reset-level voltage and the voltage (signal+reset level) of the detecting portion are input to one electrode of each of the capacitors C11, C12, C13, ... and C21, C22, C23, ... in a period during which the pulse signal S1 is High level, and held in the circuit unit 17 comprising, e.g., the latch circuit 14, line memory 15, and horizontal shift register 16.

FIG. 4 is a timing chart showing the timings of an operation of reducing the number of pixels in the circuit shown in FIG. 1. In this example, every two vertical lines are read in order. In the vertical block selection circuit 18, the signals Vblock1, Vblock2, ... sequentially change to High level at a period of 2 H in response to the horizontal sync pulse HP. The intra-block line selection circuit 19 receives the signals BLine1, BLine2, BLine3, and BLine4 in synchronism with the horizontal sync pulse HP. An operation in which the signals BLine1 and BLine3 simultaneously change to High level and the signals BLine2 and BLine4 simultaneously change to High level in the next period H is repeated. The pulse selector circuit 20 receives the pixel driving pulses RESET, READ, and ADRES, and supplies, to the pixel rows, signals obtained by ANDing these pulses and the output signals from the intra-block line selection circuit 19. Therefore, the signals RESET1 and RESET3, READ1 and READ3, and ADRES1 and ADRES3 change to High level at the same time.

In the next period H, the signals RESET2 and RESET4, READ2 and READ4, and ADRES2 and ADRES4 change to High level at the same time. This operation is repeated in the order of blocks. Both the reset-level voltage of two vertical lines and the voltage (signal+reset level) of the detecting portion are input to one electrode of each of the capacitors C11, C12, C13, ... and C21, C22, C23, ... in a period during which the pulse signal S1 is High level. In this example, averaging is performed every other line in order to average the same color in a color sensor having a Bayer pattern.

The solid-state image sensing device according to the first embodiment implements averaging by the resistance by using the output impedance of the source follower circuit. In this case, the load transistors TLM1, TLM2, TLM3, ... become common by receiving the common bias voltage VTL. When the number of vertical lines to be averaged is 2 (i.e., the number of ADRES lines to be simultaneously turned on is 2), the operating point is pulled to the power supply side, and this reduces the operation margin. As a countermeasure, the signal PMONI controls switching by the switch SW1 to raise the bias voltage VTL. Since the ON resistance of the load transistors TLM1, TLM2, TLM3, ... decreases, the operating point can be pulled back to the ground point (GND) side. That is, the operation margin lowered because the averaging operation has shifted the operating point of the vertical signal line to the power supply side is shifted to the ground point side by raising the bias voltage VTL, thereby assuring the same operation margin as the conventional operation margin. It is also possible to improve the response of the vertical signal line by raising the bias voltage VTL, thereby increasing the speed of a binning operation.

The resistance averaging method as described above does not increase the number of capacitors and requires no buffer circuit. In addition, the circuit scale of the vertical block selection circuit 18 need only be ¼ the conventional circuit. Also, the averaging operation using the resistance can average random noise of pixels and noise of the source follower circuit, thereby effectively reducing the noise.

Accordingly, the arrangement and method as described above can average pixels in the operation of reducing the number of pixels, while suppressing the increase in power consumption, without generating any spurious signal and increasing the pattern occupation area.

Note that the circuit shown in FIG. 2 and its operation have been explained by taking two-line averaging as an example. However, the intra-block line selection circuit 19 is readily applicable to three-line averaging or four-line averaging as well by increasing the number of AND circuits and the number of the input pulse signals BLine.

Second Embodiment

Figure 5:
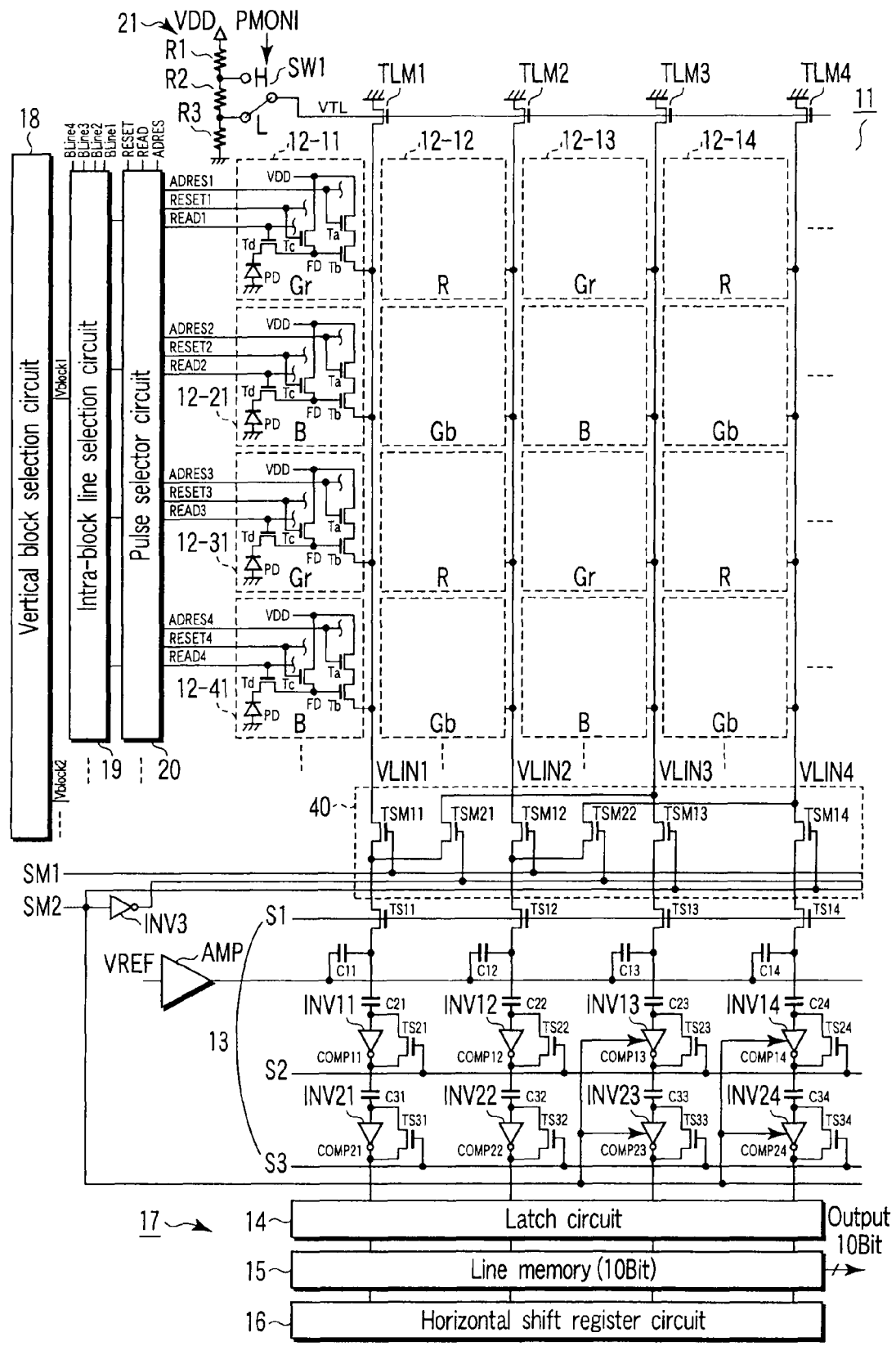
FIG. 5 is a circuit diagram which explains a solid-state image sensing device according to the second embodiment of the present invention, and shows an example of the arrangement of an amplification-type CMOS image sensor.

FIG. 5 is a circuit diagram which explains a solid-state image sensing device according to the second embodiment of the present invention, and shows an example of the arrangement of an amplification-type CMOS image sensor. This circuit shown in FIG. 5 differs from the circuit shown in FIG. 1 in that a horizontal-direction switch addition circuit 40 is formed between an image sensing region 11 and CDS & ADC 13. The switch addition circuit 40 comprises transistors TSM11, TSM12, TSM13, ... (first synthesizing switches) and transistors TSM21, TSM22, ... (second synthesizing switches). The current path of each of the transistors TSM11, TSM12, TSM13, ... is connected between the other end of a corresponding one of vertical signal lines VLIN1, VLIN2, VLIN3, ... and one end of the current path of a corresponding one of transistors TS11, TS12, TS13, .... The current path of the transistor TSM21 is connected between the other end of the vertical signal line VLIN3 and one end of the current path of the transistor TS11. The current path of the transistor TSM22 is connected between the other end of the vertical signal line VLIN4 and one end of the current path of the transistor TS12.

The gates of the transistors TSM11, TSM12, ... receive a control signal SM1. The gates of the transistors TSM13, TSM14, ... receive a control signal SM2. The gates of the transistors TSM21, TSM22, ... receive a signal obtained by inverting the control signal SM2 by an inverter INV3. The control signal SM2 is supplied to inverters INV13, INV14, INV23, and INV24 to control the operations of these inverters.

When performing no horizontal averaging in the above arrangement, the control signals SM1 and SM2 are changed to High level. When performing horizontal averaging, the control signal SM2 is changed to Low level while the control signal SM1 is maintained at High level. Consequently, the transistors TSM13 and TSM14 are turned off, and the transistors TSM21 and TSM22 are turned on. That is, the outputs from source follower circuits on alternate lines in the horizontal direction are connected via the ON resistances of the transistors TSM11 and TSM21, and the averaged signal is stored in capacitors C11 and C21 via the current path of the transistor TS11.

In the above horizontal averaging method, a bias voltage VTL can be kept at Low level even if the number of lines to be averaged increases to 2, 3, or 4. This is so because transistors TLM1, TLM2, TLM3, . . . are arranged on individual lines, so the bias voltage VTL need not be increased.

The feature of the horizontal averaging method according to the second embodiment lies in that power supply to comparator circuits CMP13, CMP14, CMP23, and CMP24 can be stopped by changing the control signal SM2 to Low level. Since only ½ the total number of stages of comparator circuits operate, the power consumption can be reduced to ½. It is also possible to double the operating speed because the number of horizontal stages to be read can be reduced to ½. In addition, three or four horizontal lines can be similarly averaged by increasing the number of the horizontal averaging transistors TSM and the number of the control signals SM.

Note that averaging in the horizontal direction can also be performed by reading all horizontal pixels and averaging them by digital signal processing.

This embodiment implements averaging of pixels by the resistance mixing operation in the operating of reducing the number of pixels by using the amplification-type CMOS image sensor. This also achieves the features that a spurious signal which is a problem in the conventional thinning operation is not generated, and the simple circuit can reduce noise.

Third Embodiment

FIG. 6 is a circuit diagram which explains a solid-state image sensing device according to the third embodiment of the present invention, and shows an example of the arrangement of an amplification-type CMOS image sensor. This circuit shown in FIG. 6 differs from the circuit shown in FIG. 5 in the circuit configuration of a switch addition circuit. That is, transistors TSM31, TSM32, . . . (synthesizing switches) are formed instead of the transistors TSM11, TSM12, TSM13, . . . , the transistors TSM21, TSM22, . . . , and the inverter INV3. Also, a control signal SM3 is used in place of the control signals SM1 and SM2.

A switch addition circuit 41 comprises the transistors TSM31, TSM32, . . . . The current path of the transistor TSM31 is connected between the other end of each of vertical signal lines VLIN1 and VLIN3. The current path of the transistor TSM32 is connected between the other end of a vertical signal line VLIN2 and the other end of a vertical signal line VLIN4. The gates of the transistors TSM31, TSM32, . . . receive the control signal SM3.

When performing no horizontal averaging in the above arrangement, the control signal SM3 is changed to Low level to turn off the transistors TSM31, TSM32, . . . . When performing horizontal averaging, the control signal SM3 is changed to High level. This turns on the transistors TSM31, TSM32, . . . That is, the outputs from source follower circuits on alternate lines in the horizontal direction are connected via the ON resistance of the transistor TSM31, and the averaged signal is stored in capacitors C11 and C21 via the current path of a transistor TS11. Simultaneously, the averaged signal is stored in capacitors C13 and C23 via the current path of a transistor TS13. Likewise, the average signal is stored in capacitors C12 and C22 via the current path of a transistor TS12, and the averaged signal is stored in capacitors C14 and C24 via the current path of a transistor TS14.

In this arrangement, therefore, noise mixing in the vertical signal lines is reduced by averaging analog signals, and noise mixing from an A/D converter is digitally averaged by digital conversion outputs, so the noise can be further reduced.

Fourth Embodiment

FIG. 7 is a circuit diagram which explains a solid-state image sensing device according to the fourth embodiment of the present invention, and shows an example of the arrangement of an amplification-type CMOS image sensor. This circuit shown in FIG. 7 differs from the circuit shown in FIG. 6 in the circuit configuration of a switch addition circuit. A switch addition circuit 42 comprises transistors TSM31, TSM32, . . . (synthesizing switches) and resistors RM1, RM2, RM3, . . . One terminal of each of the resistors RM1, RM2, . . . is connected to the other end of a corresponding one of vertical signal lines VLIN1, VLIN2, VLIN3, . . . , and the other end of each of the resistors RM1, RM2, . . . is connected to one end of the current path of a corresponding one of transistors TS11, TS12, TS13, . . . The current path of the transistor TSM31 is connected between the other terminals of the resistors RM1 and RM3. The current path of the transistor TSM32 is connected between the other terminal of the resistor RM2 and the other terminal of the resistor RM4. The gates of the transistors TSM31, TSM32, . . . receive a control signal SM3.

The above arrangement can reduce a signal voltage difference between two storage portions (the connection node between capacitors C11 and C21 and the connection node between capacitors C13 and C23) which simultaneously store the average output voltage from the vertical signal lines VLIN1 and VLIN2, by increasing the resistance value of the resistors RM1, RM2, RM3, . . . , thereby decreasing the ON resistance of the transistors TSM31, TSM32, . . . . More specifically, the signal voltage difference between the two storage portions can be reduced to 1/10 by setting the ratio of the ON resistance of the transistors TSM31, TSM32, . . . to the resistance value of RM1, RM2, RM3, . . . to 1:10. Accordingly, the fourth embodiment can further increase the noise reducing effect compared to the third embodiment.

Note that averaging in the horizontal direction can also be performed by reading all horizontal pixels and averaging them by digital signal processing.

Note also that various arrangements are applicable to the variable load circuit in the first to fourth embodiments, and an example is an arrangement as shown in FIG. 8. This variable load circuit comprises a first load transistor TLMa having a current path connected between a vertical signal line VLINn and the ground point, a second load transistor TLMb having a current path connected in parallel to the first load transistor TLMa, and a bias circuit 22 configured to selectively apply a bias voltage VTL to the gates of the first and second load transistors TLMa and TLMb. The bias circuit 22 includes resistors R4 and R5 and a switch SW2. The resistors R4 and R5 are connected in series between a power supply VDD and the ground point. The switch SW2 supplies the voltage VTL of the connection node between the resistors R4 and R5 to the gate of the load transistor TLMb, or connects the gate of the load transistor TLMb to the ground point, in response to a signal PMONI.

In a normal operation, the switch SW2 turns off the load transistor TLMb by connecting its gate to the ground point, and applies the bias voltage VTL to only the load transistor TLMa. On the other hand, when a plurality of pixel rows are simultaneously selected, the switch SW2 supplies the bias voltage VTL to the second load transistor TLMb to turn it on, thereby increasing the amount of electric current flowing through the vertical signal line VLINn. In this manner, the amount of electric current flowing through the vertical signal line VLINn in the normal operation can be changed from that when a plurality of pixel rows are simultaneously selected.

Accordingly, even the variable load circuit having the above arrangement can perform the same operation and achieve substantially the same effect as those of the variable load circuit in the first to fourth embodiments.

Furthermore, instead of the variable load circuit, it is also possible to use a current amount switching circuit configured to increase the amount of electric current flowing through a vertical signal line when a plurality of pixel rows are simultaneously selected.

As described above, one aspect of the present invention can prevent the deterioration in image quality caused by a spurious signal without increasing the pattern occupation area or power consumption. It is also possible to obtain the pixel noise reducing effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image sensing device comprising:
an image sensing region in which pixels are two-dimensionally arranged into rows and columns on a semiconductor substrate, the pixel comprising a photoelectric conversion circuit configured to convert an optical signal into a signal charge and store the signal charge, a read circuit configured to read out the electric charge stored in the photoelectric conversion circuit to a detecting portion, an amplification circuit configured to amplify and output a voltage corresponding to an amount of electric charge in the detecting portion, and a reset circuit configured to reset the electric charge in the detecting portion;
a vertical signal line connected to each pixel column in the image sensing region;
a storage circuit configured to hold a voltage read out to the vertical signal line from each amplification circuit in a selected pixel row;
a switch addition circuit formed between the image sensing region and the storage circuit, and configured to connect a plurality of vertical signal lines to an input terminal of the storage circuit and add data read out from a plurality of pixels; and
a variable load circuit connected to the vertical signal line, and configured to increase an electric current flowing through the vertical signal line when a plurality of pixel rows are simultaneously selected,
wherein the variable load circuit comprises a first load transistor whose current path is connected between the vertical signal line and a ground point, a second load transistor whose current path is connected in parallel to the first load transistor, and a bias circuit configured to selectively apply a bias voltage to gates of the first load transistor and the second load transistor, and the bias circuit applies the bias voltage to the gate of the first load transistor to turn on the first load transistor in a normal operation, and applies the bias voltage to the gates of the first load transistor and the second load transistor to turn on the first load transistor and the second load transistor when a plurality of pixel rows are simultaneously selected, thereby increasing an amount of electric current flowing through the vertical signal line.

2. A solid-state image sensing device comprising:
an image sensing region in which pixels are two-dimensionally arranged into rows and columns on a semiconductor substrate, the pixel comprising a photoelectric conversion circuit configured to convert an optical signal into a signal charge and store the signal charge, a read circuit configured to read out the electric charge stored in the photoelectric conversion circuit to a detecting portion, an amplification circuit configured to amplify and output a voltage corresponding to an amount of electric charge in the detecting portion, and a reset circuit configured to reset the electric charge in the detecting portion;
a vertical signal line connected to each pixel column in the image sensing region;
an analog-to-digital conversion circuit configured to perform analog-to-digital conversion on the voltage read out to the vertical signal line from each amplification circuit in a selected pixel row;
a holding circuit configured to hold digital data obtained by the analog-to-digital conversion circuit;
a switch addition circuit formed between the image sensing region and the analog-to-digital conversion circuit, and configured to connect a plurality of vertical signal lines to an input terminal of the analog-to-digital conversion circuit and add data read out from a plurality of pixels, the switch addition circuit comprising a first synthesizing switch whose current path is connected between the vertical signal line and an input terminal of the analog-to-digital conversion circuit, and a second synthesizing switch whose current path is connected between the vertical signal line and an input terminal, which is different from the input terminal connected to the first synthesizing switch, of the analog-to-digital conversion circuit,
wherein when the second synthesizing switch is turned on, a portion of the analog-to-digital conversion circuit connected to the second synthesizing switch is stopped, and
a variable load circuit connected to the vertical signal line, wherein the variable load circuit comprises a first load transistor whose current path is connected between the vertical signal line and a ground point, a second load transistor whose current path is connected in parallel to the first load transistor, and a bias circuit configured to selectively apply a bias voltage to gates of the first load transistor and the second load transistor, and the bias circuit applies the bias voltage to the gate of the first load transistor to turn on the first load transistor in a normal operation, and applies the bias voltage to the gates of the first load transistor and the second load transistor to turn on the first load transistor and the second load transistor when a plurality of pixel rows are simultaneously selected, thereby increasing an amount of electric current flowing through the vertical signal line.

* * * * *